United States Patent [19]

Hill

[11] Patent Number: 4,836,930

[45] Date of Patent: Jun. 6, 1989

[54] METHOD OF REPAIRING VEHICULAR TIRES

[76] Inventor: William R. Hill, P.O. Box 8310, Nashville, Tenn. 37207

[21] Appl. No.: 157,250

[22] Filed: Feb. 18, 1988

[51] Int. Cl.$^4$ .................. B32B 25/02; B32B 31/20; B32B 31/16

[52] U.S. Cl. ........................... 156/97; 156/98; 264/36

[58] Field of Search .............. 152/367, 368, 373, 370; 156/95, 97, 98, 96; 264/36

[56] References Cited

U.S. PATENT DOCUMENTS

| | | | |
|---|---|---|---|
| 1,657,289 | 1/1928 | Voss | 152/371 |
| 2,342,195 | 2/1944 | Heintz | 152/367 |
| 3,198,234 | 8/1965 | Massoubre et al. | 152/367 |
| 3,299,936 | 1/1967 | Vanden Berg | 152/367 |
| 3,306,332 | 2/1967 | Williams et al. | 152/367 |
| 4,333,508 | 6/1982 | Di Rocco | 152/367 |
| 4,385,651 | 5/1983 | Arquilla | 152/367 |
| 4,618,519 | 10/1986 | Koch et al. | 152/367 |

FOREIGN PATENT DOCUMENTS 311056  5/1929  United Kingdom ............. 156/95

Primary Examiner—Willard Hoag
Attorney, Agent, or Firm—Pitts & Brittian

[57] ABSTRACT

A method for the restoration of radial cord vehicular tires having damaged cords. A portion of the inner surface of the tire casing is removed over a region including at least the damaged area to a depth sufficient to remove all damaged radial cords. This removal region includes up to, and across, both bead portions of the casing. A patch unit having a conforming outline to that of the trough created by the removal is inserted into the trough and is bonded therein. This patch unit extends in the trough across the bead portions. The patch unit contains reinforcing cords to replace those that are removed. Preferably, the body of the patch unit is formed of uncured rubber which is cured in place in the casing so as to become permanently bonded to the casing. Cosmetic repair of the external surface can be accomplished by removing damaged material and thereafter filling the region, preferably with uncured rubber that is cured in place. Tires restored according to this method have performance equivalent to undamaged tires.

15 Claims, 3 Drawing Sheets

METHOD OF REPAIRING VEHICULAR TIRES

TECHNICAL FIELD

This invention relates generally to the repair of vehicular pneumatic tires, and more particularly to a method of, and a patch unit for, repairing high pressure radial tires as utilized for trucks and off-highway vehicles.

BACKGROUND ART

It is conventional practice to repair pneumatic vehicular tires, when such are damaged, by the application of some form of patch upon the interior surface of the casing. This is true when the casing has been punctured or otherwise damaged to an extent that a "plug" repair is not practical. Typical of the types of patch units utilized for these repairs are described in U.S. Pat. Nos. 1,657,289, issued to L. H. Voss on Jan. 24, 1928; 2,342,195, issued to J. C. Heintz on Feb. 22, 1944; 3,198,234, issued to J. Massoubre on Aug. 3, 1965; 3,299,936 issued to J. Van Deen Berg on Jan. 24, 1967; 4,333,508, issued to J. DiRocco, et al., on June 8, 1982; and 4,385,651, issued to J. V. Arquilla on May 31, 1983.

While the patches described in the above-cited references, as well as other patch units that are conventionally available, are generally suitable for passenger-type vehicles, repairs to high pressure tires of trucks and off-highway vehicles are only marginally successful. These tires, for example, are usually pressurized to 100-110 psi and often attain temperatures while at highway speeds approaching 300 degrees F. Under these conditions, the known patch units having cords therein fatigue quickly, thereby allowing a swelling and producing an external bump at the damaged area. If the bump is removed, as by buffing, it will be found that the cords have stretched from this fatigue and have "extruded" the rubber component through the wall of the tire. Thus, the only benefit served by the patches is to seal against air loss. No strength is added, however, despite the cords of the patch which in contrast tend to loosen the patch due to the stretching thereof. Furthermore, the extra thickness that is produced adversely affects the balance of the tire giving rise to premature excessive wear. Of particular detriment, these patches create abrasion against a tube giving rise to eventual failure thereof.

Accordingly, it is one object of the present invention to provide a method for the repair of vehicular tires wherein the repaired tire is substantially restored to its initial condition.

It is another object of the present invention to provide a patch for the restoration of high pressure tires typically utilized for highway trucks and off-highway vehicles, such as those used in mining, etc.

It is also a object of the present invention to provide a method for the repair of all types of radial cord ties such that the balance thereof is substantially unaffected as a result of the repair.

A further object of the present invention is to provide a method of repairing tires that utilize tubes therein whereby the repaired tire will not cause abrasion of the tube during use of the tire.

These and other objects of the present invention will become apparent upon a consideration of the full description thereof when taken in combination with the drawings and the appended claims.

SUMMARY OF THE INVENTION

In accordance with the present invention, there is provided a method for the restoration of a radial cord tire to a condition substantially that of the originally fabricated tire. This is achieved by removing from the interior surface of the tire casing a region of sufficient depth and width such that any damaged cords are removed in their entirety, with this removed region extending to and across both bead portions of the casing. The trough produced by this removal is substantially rectangular in cross-section, and in the wall area is tapered in a radial direction so as to match the path of the radial cords. If desired, any damaged region of the exterior of the casing can also be removed. A patch unit is thereafter positioned in the trough, with the perimeter of the patch closely matching the edge shape of the trough, and the thickness of the patch closely approximating the depth of the trough. This patch contains radially-extending cords of a material to match those of the tire casing, with these cords being bonded in a heat-curable uncured rubber. After placing the casing containing the patch unit in a suitable external-conforming mold and an interior support, the tire is heated to a temperature and for a time sufficient to cure the patch unit into position within the trough. If any exterior portion of the casing has been removed to correct for damage, it can be filled with uncured rubber prior to the heating step so as to cure the same during the curing of the patch. The resultantly restored tire has been demonstrated to perform in an equivalent manner to a new tire.

BEST MODE FOR CARRYING OUT THE INVENTION

Figure 1:
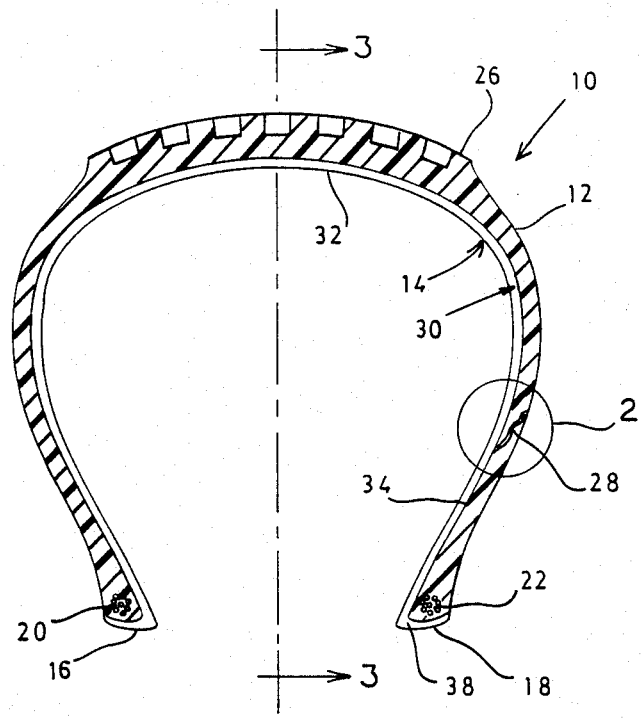
FIG. 1 is a transverse cross-section of a typical vehicular tire casing illustrating the removal of a damaged area, with the removed area extending to and across both bead portions of the casing.
Figure 2:
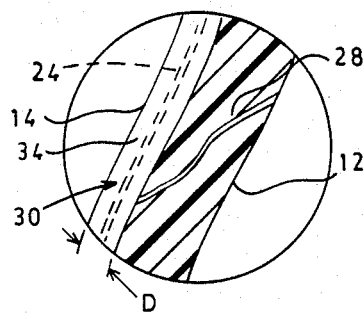
FIG. 2 is an enlarged partial cross-section of the casing illustrated in FIG. 1 taken at 2 therein.
Figure 3:
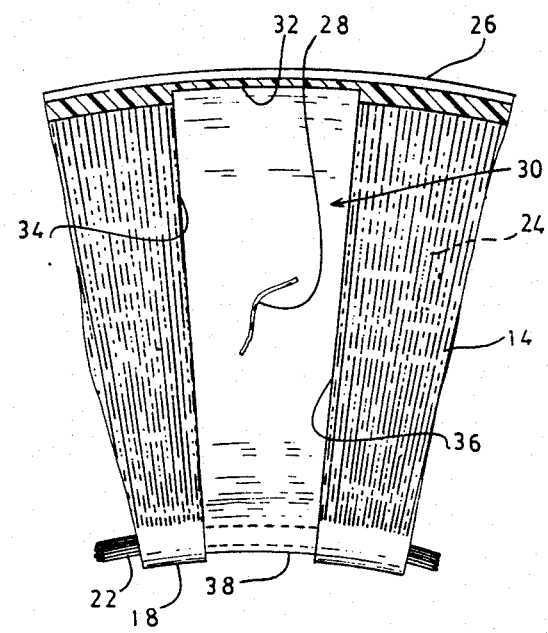
FIG. 3 is a partial longitudinal cross-section of the casing of FIG. 1 taken at 3—3 thereof.

The first step of the present invention can be best understood by referring to FIGS. 1 through 3. Shown generally at 10 therein is a typical tire casing for which restoration is desired. It should be understood that this restoration is applicable for damage in the side walls or in the face of the tire. This casing 10 has a conventional exterior surface 12 and interior surface 14. Also, there are the normal bead portions 16, 18 each containing reinforcing strands 20, 22. Due to the scale of the drawing of FIG. 1, interior structural cords are not shown; however, these cords 24 are illustrated in FIGS. 2 and 3. Typically, there also will be a belt-type cord (not shown) in the tire casing 10. The tread region 26 of the casing can be integrally formed as illustrated, or can be a "retread" placed upon a casing where the prior tread has become excessively worn. Illustrated in these figures is a damaged area 28 extending through the side wall.

This first step in the restoration involves removing a portion of the interior surface of the casing so as to make a groove or trough 30. The removal, which includes at least all damaged radial reinforcing cords, is typically accomplished using a rotary cutting tool, such as a carbide-tipped grinding stone or wheel, followed by a conventional air buffer. During this removal operation the tire is held in a tire spreader to provide improved access to the interior surface (the tire remains in the spreader until after insertion of a patch unit). This trough has a substantially rectangular outline in cross-section and is substantially rectangular in outline in the tread portion (at 32) of the casing with the outline tapering radially (at 34, 36) toward the beads. Further, this trough extends out across the bead portions 16, 18 (at 38). The depth and width of the trough are sufficient so as to completely remove at least all damaged radial cords from one bead portion to the other bead portion. This is particularly illustrated in FIG. 3.

Figure 4:
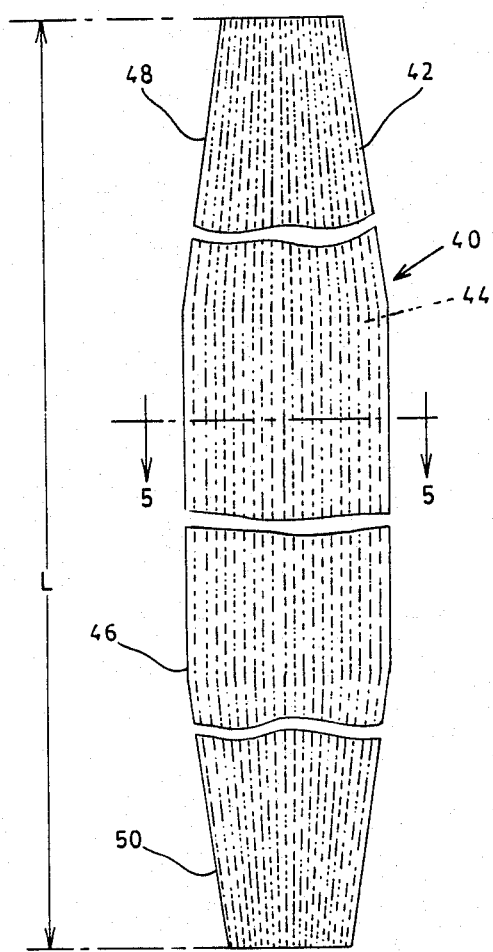
FIG. 4 is a plan view of a patch unit used for the restoration of tires according to the present invention.
Figure 5:
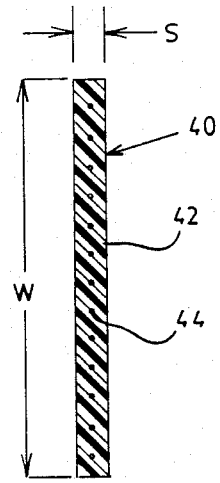
FIG. 5 is a transverse cross-section of the patch unit of FIG. 4.

A patch unit for use with the method of the present invention is shown at 40 in FIGS. 4 and 5. This patch unit has a body 42 of uncured rubber that contains reinforcing cords 44 that extend along the length of the patch. These cords are fabricated of the same material as that used in the particular tire to be restored, e.g., synthetic fibers, metal strands, etc. Anyone of the types of rubber as now used in tire repair, and as known to those versed in the art, can be used to encase and bond these cords. The central portion of the patch, as at 46, has substantially the same outline as the trough 30 in the tread region of the tire casing. The end portions are tapered, as at 48, 50, so as to substantially conform to the trough 30 in the wall portions of the tire. The thickness, S, of the patch is substantially the same as the depth, D, of the trough (see FIG. 2), and the width, W, and length, L, of the patch further substantially match the corresponding dimensions of the trough 30.

This patch unit 40 is placed in the trough 30, after trimming, if necessary, to conform to the size of the trough, and is temporarily held in place using a conventional cement. This cement produces a bond between the patch unit and the tire casing when the spreader is removed. The patch unit 40 is then cured into place within the casing by the application of heat. This is accomplished using a conventional technique often utilized for the application of a surface patch. This is effected by placing the casing into a suitable mold that conforms to the exterior surface and, for example, by placing an inflatable bladder on the inner surface. This bladder has means for applying heat to the inner wall of the tire so as to raise the temperature to about 280 to 300 degrees F. at which temperature the uncured rubber of the patch unit is cured and permanently bonded to the surfaces of the trough 30. The inner surface of the patch unit 40 thereby is made to closely conform to the normal inner surface of the casing. It will be recognized tat other means can be employed to press the patch into place and heat to cure the rubber.

Figure 6:
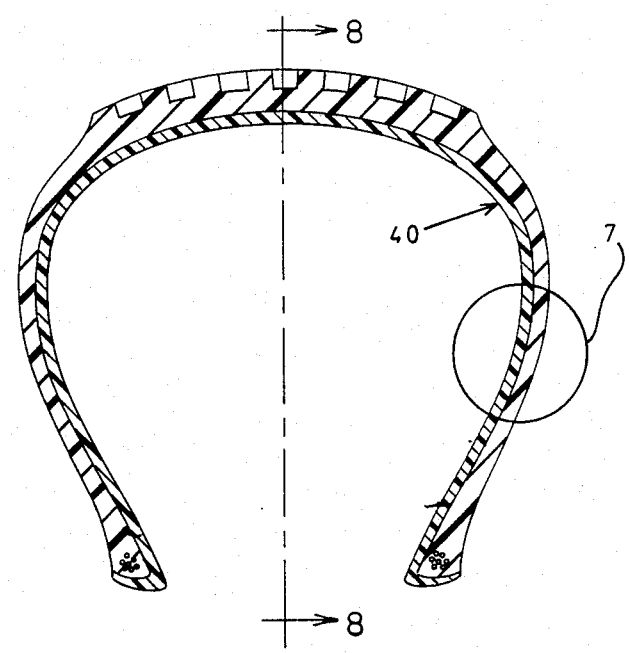
FIG. 6 is a transverse cross-section of a vehicular tire casing illustrating the restoration thereof by the insertion of a patch unit, of the type shown in FIG. 4, in the trough produced by the removal of interior material shown in FIG. 1.
Figure 7:
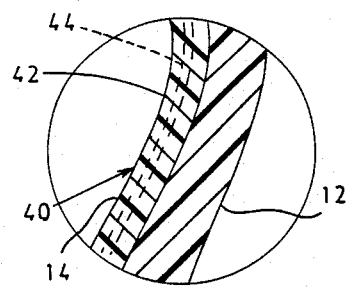
FIG. 7 is an enlarged partial cross-section of the casing illustrated in FIG. 6 taken at 7 therein.
Figure 8:
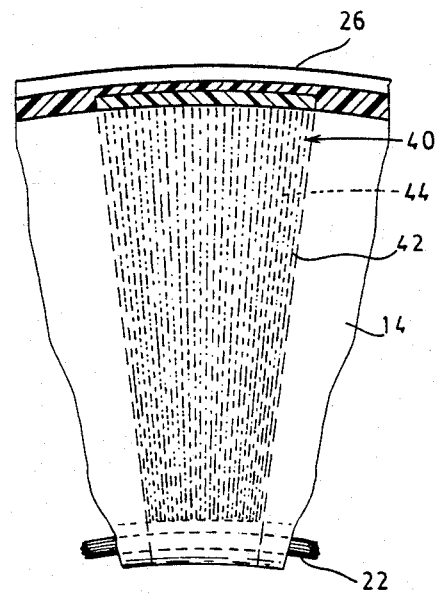
FIG. 8 is a partial longitudinal cross-section of the casing of FIG. 6 taken at 8—8 thereof.

Referring now to FIGS. 6 through 8, it can be seen that the tire casing 10 is restored by the insertion of the patch unit 40 into the trough 30 previously formed in the interior surface of the casing. In FIG. 6, the reinforcing cords 44 of the patch are not illustrated; however, these can be seen in FIGS. 7 and 8. The reinforcing cords 24 of the original casing are not shown in FIGS. 7 and 8 so as to more clearly define the reinforcing cords 44 of the patch unit.

Figure 9:
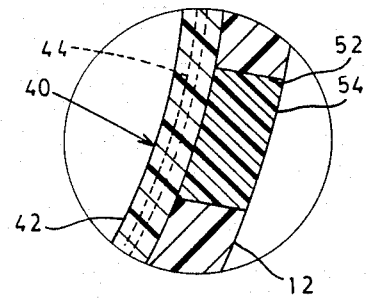
FIG. 9 is an enlarged cross-sectional view of a wall of a tire casing in which is illustrated the repair of the exterior surface of a tire casing in conjunction with the placement of a patch unit on the interior thereof.

As is often the case when damage occurs to the reinforcing cords of a tire casing, there is visible damage to the exterior casing at that point. Although the above-described restoration method using the patch unit is sufficient to return the tire to a useful condition, it may be desirable to correct the visible damage to cosmetically improve the tire casing. This correction is illustrated in FIG. 9. After the inner trough 30 is prepared, the remaining casing wall at the damaged position is removed to produce an opening 52. This opening is filled with an uncured rubber 54 which is then cured during the curing of the patch unit 40.

Truck tires restored according to the present invention have been utilized on trucks where their performance has been compared to tires that have not been restored (had no injury). There has been no early failure of these restored tires after considerable tread wear has occurred. Some tires have had as many as 16 strands of reinforcing cord removed (which corresponds to about two inches of width) and were restored without cosmetic repair: in fact, the damaged wall area was removed and left unfilled to observe the patch. The tires were pressurized to 100–110 psi for this operation. No abrasion of the tire tube was noted Furthermore, the resultant restored tire had substantially the same weight at all portions thereof so that the balance thereof was affected negligibly.

From the foregoing, it will be understood by those versed in the art that an improved method for the repair of vehicular tires has been developed which substantially restores the tire to a condition approaching that of a new tire. This method employs a patch unit designed specifically for this restoration. Any examples given herein are for illustration purpose only. The invention, therefore, is not to be limited by such examples, but is to be limited only by the appended claims and their equivalents when read in combination with the description and the drawings.

I claim:

1. A method for the restoration of a radial tire casing having a damage area including at least one damaged radial cord, said casing having an inner surface, an outer surface, a tread portion, side wall portions and first and further bead portions to engage a tire rim, which comprises the steps of:

removing material from said inner surface of said casing to a depth sufficient to remove all damaged radial cords from said casing to define a trough extending from said first bead portion to said further bead portion, including across both said bead portions, said trough having a peripheral contour in said side wall portions that tapers to conform to paths of radial cords in said casing;

inserting in said trough a patch unit having a peripheral contour corresponding to said peripheral contour of said trough and a thickness corresponding to said depth of said trough, said patch unit formed of uncured rubber and containing reinforcing cords substantially extending from a first end to a further end, said patch unit having a length sufficient to extend across said bead portions when inserted in said trough; and heating said patch unit and said casing at said trough to a temperature for a time sufficient to cure said uncured rubber of said patch unit and thereby secure said patch unit in said trough whereby said reinforcing cords of said patch unit replace damaged cords of said casing to thereby restore said tire.

2. The method of claim 1 further comprising:

removing material from said casing at said damage area to form an opening from said trough to said outer surface;

filling said opening with an uncured rubber; and heating said uncured rubber in said opening during said heating of said casing and said patch unit to a temperature to cure said rubber and secure said rubber to said casing.

3. The method of claim 1 further including applying a cement to surfaces of said trough and corresponding surfaces of said patch unit prior to the step of inserting said patch unit into said trough.

4. The method of claim 1 wherein said tire casing is placed in an exterior confining mold after said inserting of said patch unit and prior to said heating step, said heating step including applying pressure to said patch unit in a direction toward said casing to assure a bond between said patch unit and said casing after said heating step is concluded.

5. The method of claim 1 wherein said step of removing material from said inner surface includes grinding out said material with a rotary cutting tool.

6. The method of claim 4 including spreading said first and further bead portions prior to said removing step.

7. A method for the restoration of a radial tire casing having a damage area including at least one damaged radial cord, said casing having an inner surface, an outer surface, a tread portion, side wall portions and first and further bead portions to engage a tire rim, which comprises the steps of:

removing material from said inner surface of said casing with a carbide-tipped rotary cutting tool to a depth sufficient to remove all damaged radial cords from said casing to define a trough extending from said first bead portion to said further bead portion, including across both said bead portions, said trough having a substantially rectangular cross-section and a peripheral contour in said side wall portions that tapers to conform to paths of radial cords in said casing;

coating surfaces of said trough with a cement;

inserting in said trough a patch unit having a peripheral contour corresponding to said peripheral contour of said trough and a thickness corresponding to said depth of said trough, said patch unit formed of uncured rubber and containing reinforcing cords substantially extending from a first end to a further end, said patch unit having a length sufficient to extent across said bead portions when inserted in said trough, said patch unit being coated with a cement on surfaces for contact with said trough; and heating said patch unit and said casing at said trough to a temperature to cure said uncured rubber of said patch unit and thereby secure said patch unit in said trough whereby said reinforcing cords of said patch unit replace damaged cords of said casing to thereby restore said tire.

8. The method of claim 7 further comprising:

removing material from said casing at said damage area subsequent to forming said trough to form an opening from said trough to said outer surface;

filling said opening with an uncured rubber; and heating said uncured rubber in said opening during said heating of said casing and said patch unit to a temperature to cure said rubber and secure said rubber to said casing.

9. The method of claim 7 including spreading said first and further bead portions prior to said removing step.

10. The method of claim 7 wherein said tire casing is placed in an exterior confining mold after said inserting of said patch unit and prior to said heating step, said heating step including applying pressure to said patch unit in a direction toward said casing to assure a bond between said patch unit and said casing after said heating step is concluded.

11. A method for the restoration of radial tire casing having a damage area including at least one damaged radial cord, said casing having an inner surface, an outer surface, a tread portion, side wall portions and first and further bead portions to engage a tire rim, which comprises the steps of:

spreading apart said first and further bead portions of said casing with a spreader;

removing material from said inner surface of said casing with a carbide-tipped rotary cutting tool to a depth sufficient to remove all damaged radial cords from said casing to define a trough extending from said first bead portion to said further bead portion, including across both said bead portions, said trough having a substantially rectangular cross-section and a peripheral contour in said side wall portions that tapers to conform to paths of radial cords in said casing;

coating surfaces of said trough with a cement;

inserting in said trough a patch unit having a peripheral contour corresponding to said peripheral contour of said trough and a thickness corresponding to said depth of said trough, said patch unit formed of uncured rubber and containing reinforcing cords substantially extending from a first end to a further end, said patch unit having a length sufficient to extend across said bead portions when inserted in said trough, said patch unit being coated with a cement on surfaces for contact with said trough;

removing said spreader from said casing;

inserting said casing into an exterior contacting mold at the location of said patch unit;

applying pressure to an interior surface of said patch unit;

heating said patch unit and said casing at said trough to a temperature for a time sufficient to cure said uncured rubber of said patch unit and thereby secure said patch unit in said trough whereby said reinforcing cords of said patch unit replace damaged cords of said casing to thereby restore said tire; and removing said restored tire from said mold.

12. The method of claim 11 further comprising:

removing material from said casing at said damage area subsequent to forming said trough to form an opening from said trough to said outer surface;

filling said opening with an uncured rubber; and heating said uncured rubber in said opening during said heating of said casing and said patch to cure said rubber in said opening and secure said rubber to said casing.

13. The method of claim 11 wherein said cords in said casing and in said patch units are fabricated of steel.

14. The method of claim 11 wherein said applying of pressure is accomplished by inserting an inflatable bladder within said casing, and inflating said bladder against said patch unit.

15. The method of claim 11 wherein said heating step for curing said rubber of said patch unit is about 280 to about 300 degrees F.

* * * * *